3,115,412
NUT-CONTAINING EMULSION AND METHOD OF MAKING THE SAME

Heinrich Schoppe and Paula Willis, Hamburg, Germany, assignors to H. Schoppe & Schultz, Hamburg, Germany
No Drawing. Filed Apr. 2, 1962, Ser. No. 184,595
Claims priority, application Germany Apr. 1, 1961
14 Claims. (Cl. 99—126)

The present invention relates to a nut-containing cream and to a method of making the same. More particularly the present invention is concerned with producing nut masses and nut-containing masses which can be readily incorporated in creams which may be emulsions such as whipped cream, butter cream and the like, so as to form a substantially homogeneous mixture with the same.

Methods are known for producing marzipan, persipan, nut masses and nougat masses as well as nut meat masses. Marzipan masses, for instance, generally consist of a mixture of moist ground almonds and sugar and contain a predetermined percentage of moisture. Persipan masses consist mainly of a mixture of apricot or peach kernels which have been treated so as to remove most of the bitterness thereof, and sugar, frequently with an addition of almonds and of a small quantity such as about ½% of starch, for instance, potato starch. Nut masses may be formed of filberts or other nuts and sugar, while nougat masses usually consist of a mixture of filberts and/or almonds with or without the addition of cocoa constituents and sugar. Nut meat comprises finely comminuted roasted or unroasted nuts, the skin of which may or may not have been removed. These nut masses preferably are comminuted by passing the same through a roller assembly so that the particle size of the individual nut particles will be below 15 microns, preferably about 8 microns.

These masses which are only broadly described above since the manner in which the same are produced is well known in the art, primarily in the confectionary and bakery trade, are commercially available in solid, paste-like and highly viscous condition.

However, the working up of these masses in the bakery and confectionary industries frequently is connected with serious difficulties, particularly when it is desired to incorporate the same in certain types of bakery wares or creams used in the bakery and confectionary trade, such as whipped cream and butter cream. When it is desired to incorporate nut-containing masses in creams, for instance in whipped cream or butter cream, it is found that a reasonably even mixing of the nut-containing mass with the cream is difficult and time consuming. The nut-containing masses first must be slowly heated so as to reduce their viscosity or to make them liquid at least to such an extent that they can be more or less evenly distributed in the cream which, in the case of whipped cream and butter cream, essentially will be a fat emulsion, which, however, may also be a different type of cream such as a sugar cream used for filling candies or the like.

Thus, it is well known that whipped cream can only be worked up in relatively cool condition while, on the other hand, nougat or other nut-containing masses will possess the required flowability only when heated, and thus should be incorporated into the whipped cream or the like at a higher temperature than is compatible with such cream. Due to this difficulty, namely, the relatively high temperature of the nougat or the like, the whipped cream will lose its homogeneity when being mixed with the heated nut-containing mass. To some extent separation of the whipped cream into a liquid and a relatively stiff remaining portion of whipped cream might take place.

The entire nut-containing whipped cream mixture will thus change to acquire a streaky and uneven appearance. The same difficulty will be experienced when incorporating marzipan, nougat or other nut-containing masses for instance into a butter cream of the type used in various desserts and bakery products.

To overcome these difficulties, the baker usually attempts to mix in a tedious and time-consuming process small quantities of the cream on the one hand and of the heated nut-containing mass on the other hand and to add slowly additional quantities of these two ingredients while continuing to stir the mixture. This process is time-consuming, requires careful attention, does not lend itself well to being mechanized but is rather done by hand and, nevertheless, frequently does not result in the desired homogeneous appearance of the nut mass-containing butter cream, whipped cream or the like.

It is therefore an object of the present invention to overcome the above discussed difficulties and disadvantages.

It is a further object of the present invention to provide a method for producing a nut-containing mass which may be readily mixed with a cream-like carrier so as to form therewith a homogeneous mixture without impairing the quality of the cream.

It is a further object of the present invention to provide a method by which homogeneous mixtures of a nut-containing mass and a suitable cream such as for instance whipped cream or butter cream, can be produced in a simple and economical manner.

Other objects and advantages of the present invention will become apparent from a further reading of the description and of the appended claims.

With the above and other objects in view, the present invention contemplates in a method of producing a nut-containing mass adapted to form a substantially homogeneous mixture with an edible cream, the steps of mixing a non-flowable, finely subdivided nut-containing mass with an aqueous liquid so as to form a flowable mixture, drying the flowable mixture at a temperature sufficiently low to avoid any deleterious effect on the nut content thereof so as to transform the flowable mixture into a dried mass, and finely comminuting the thus formed dried mass, whereby a pulverulent mass is formed adapted to be incorporated in a fat emulsion so as to form a substantially homogeneous mixture.

According to the preferred embodiment, the present invention also comprises in a method of producing a nut-containing mass adapted to form a substantially homogeneous mixture with a fat emulsion, the steps of mixing a finely subdivided nut-containing mass selected from the group consisting of nut meat mass, nougat mass, marzipan mass and persipan mass and the nut particles of which are of a particle size not exceeding about 15 microns with an aqueous liquid so as to form a flowable mixture of sufficiently low viscosity to permit spray drying thereof, spray drying the flowable mixture at a temperature sufficiently low to avoid any deleterious effect on the nut content thereof so as to transform the flowable mixture into a dried mass, and finely comminuting the thus formed dried mass, whereby a pulverulent mass is formed adapted to be incorporated in a fat emulsion so as to form a substantially homogeneous mixture.

In addition, the present invention is concerned with producing a homogeneous mixture of a nut-containing mass and a fat emulsion by mixing a finely subdivided nut-containing mass selected from the group consisting of nut meat mass, nougat mass, marzipan mass and persipan mass and the nut particles of which are of a particle size not exceeding about 15 microns with an aqueous liquid including at least one substance selected from the group consisting of sugars and milk so as to form a flowable mixture of sufficiently low viscosity to permit spray drying thereof, spray drying the flowable mixture at a temperature sufficiently low to avoid any deleterious effect on the nut content thereof so as to transform the flowable mixture into a dried mass, comminuting the thus formed dried mass to a particle size adapted to pass through a 100 mesh per square centimeter screen, and evenly distributing the thus comminuted mass in a fat emulsion selected from the group consisting of butter cream and whipped cream.

The present invention also includes the product which is obtained by the method of the present invention as outlined above.

Surprisingly, applicants have found that disadvantages such as those which were discussed further above can be overcome by comminuting the nut-containing mass such as marzipan or nougat or the like by passing the same through an assembly of rollers so that particles of a size of preferably below 15 microns and most preferably of about 5 microns are formed. The thus finely comminuted nut-containing mass is then mixed with water or an aqueous liquid such as milk, under stirring and heating so as to form a liquid or suspension of relatively low viscosity, for instance a viscosity or consistency comparable to that of evaporated milk. The viscosity of the thus formed nut particles-containing liquid should be such that the same can be dried under very mild condition, preferably by spray drying. By spray drying the nut particles-containing liquid, a dried product is obtained which then preferably is screen ground so as to form a pulverulent mass, either in the form of a powder which will pass through a sieve having 100 mesh per square centimeter, or to form granules which will pass through a sieve having 25 mesh per square centimeter. The thus prepared pulverulent mass is then ready to be mixed into the cream base, such as whipped cream or butter cream or the like, and surprisingly it will be found that in this manner a completely homogeneous mixture of cream and nut-containing mass can be obtained which is of even color and texture and free of streaky or otherwise uneven appearance. Although the term might not be technically correct, it could be said that the thus spray dried nut-containing material appears to "dissolve" in the whipped cream, butter cream, or the like.

If the spray dried material is not to be incorporated in the cream within a relatively short time after it has been produced, the spray dried nut-containing granules or powder are preferably stored in sealed containers under substantial exclusion of air in order to avoid undesirable oxidation phenomena.

When then taken from such air-tight storage container, the nut meat, nougat, marzipan or the like powder or granules can be worked into whipped cream, butter cream or the like in the same surprisingly simple manner as described above, by just being added, for instance, to the whipped cream and mixed with the same by beating for a short period of time with a suitable beater such as an egg beater, cream whipper or the like.

The method of the present invention is suitable for the incorporation into creams of practically all types of nuts, such as filberts, almonds, walnuts, coconuts, peanuts, cashew or brazil nuts, as well as pistachio, peach, apricot and pine kernels or of masses containing the same.

It is preferred but not absolutely required according to the present invention that the respective nuts or kernels prior to their processing into a mass such as marzipan or the like will be roasted and/or skinned and thereafter passed through rollers or otherwise comminuted to a particle size preferably below 15 microns.

The fat content of the nut-containing mass can be controlled as desired as known per se by the addition of cocoa mass, cocoa-butter, hard fats, milk fat, nut oils or the like. The color of the nut-containing mass may be adjusted by adding, for instance cocoa powder, milk powder, caramel, ground coffee or the like. Taste and aroma may also be adjusted, as well known per se, by adding for instance vanilla, ground cinnamon or other spices and the like. The sugar, i.e. saccharose, of the nut-containing mass or also of the liquid which is added thereto in order to produce a flowable mass which can be spray dried, if such liquid contains sugar at all, may be replaced in full or in part for instance with dextrose, caramel or the like. The pulverulent product which is obtained by spray drying or after grinding and screening the spray dried product, will have a practically unlimited shelf life, provided it is protected against the access of oxygen; and it will not cake or harden during storage.

The incorporation of the spray dried powder or granules into the base cream such as whipped cream, butter cream, or a sugar cream, for instance, for filling candies or the like, requires the presence of at least a small amount of water. If the base cream initially is free of water, such as for instance a fat cream produced of hard fats such as hydrogenated or hardened palm oil, then, the pulverulent spray dried product first should be stirred with a small amount of water, for instance with an amount of water equal to about 3% of the spray dried product, prior to being incorporated into the substantially water-free fat cream.

The following examples are given as illustrative only of the process of the present invention without, however, limiting the invention to the specific details of the examples.

EXAMPLE I

A pulverulent product according to the present invention which can be incorporated into a cream so as to form a homogeneous mixture therewith may be produced, for instance, in the follownig manner:

500 grams ground filberts or hazel nuts and 450 grams sugar are stirred with a quantity of milk sufficient to form thereof a homogeneous mass which will contain the equivalent of about 50 grams dried milk powder. The thus-formed flowable mass is then spray dried and, if necessary, thereafter subjected to screen grinding until the desired fineness is obtained, for instance, a fineness such that the particles may pass through screens having between 100 and 25 mesh per square centimeter. If desired, additional flavoring substances such as vanilla may be added. The sugar may be fully or partially replaced by corn sugar, dextrose, caramel, or the like. In this manner, a pulverulent product is obtained which must be packed up impervious to air and moisture.

The dry pulverulent product can be added to and mixed with whipped cream or dessert creams in an amount of 10% per weight, to ice-cream in an amount of 15% per weight or to pudding or sauce powder in an amount of 50% per weight.

Before adding to a waterfree mass, for instance buttercream or the like, the dry pulverulent product is to be previously stirred up with 3% per weight of water (based on the weight of the dry product).

The product according to the invention can be so evenly distributed as to appear dissolved therein.

EXAMPLE II

A nougat mass is heated to about 40° C. and mixed with an equal quantity of water of about 40° C. in which about 5% per weight (based on the weight of the nougat mass) of cocoa powder have been suspended. The mixture is stirred into a homogeneous flowable mass and then spray dried and further treated and consumed as described in Example I.

EXAMPLE III

A marzipan mass or a mixture of the individual constituents thereof is finely comminuted, for instance, by being passed through a roller assembly so that individual particles preferably having a size not exceeding 15 microns are obtained. The thus obtained powder is then stirred with hot water to form a liquid mass which is then spray dried and further treated and consumed as described in Example I.

EXAMPLE IV 400 grams ground filberts or hazel nuts, 350 grams sugar, 100 grams dextrose, 75 grams cocoa powder, 75 grams milk powder and 0.1 gram vanilla are stirred with 2 litres water to form a homogeneous flowable mass. The thus formed mass is then spray dried to form an instant powder and further treated and consumed as described in Example I.

The dry pulverulent product is particularly adapted as addition to whipped cream, fat creams or chocolate-cream for pastries and filling candies and especially as an easily milk-dissolved powder for baby food.

EXAMPLE V 1500 grams skinned and ground almonds were stirred with 2 litres milk of about 60° C. to a homogeneous mass. 30 grams cocoa-butter of about 45° C., 1200 grams sugar syrup, 300 grams caramel and 0.1 gram ground cinnamon are added. The mixture is stirred into a homogeneous flowable mass and then dried on a cylinder dryer at a temperature not higher than 70° C.

The dry product is ground and screened and packed up as described in Example I. This product is suitable as addition to flour for bakery purpose.

EXAMPLE VI 400 grams disbittered and ground apricot-kernels, 600 grams sugar and 200 grams water of about 60° C. are mixed. This mass is then extended on plates and dried in an airstream of about max. 75° C.

The dry ground and screened product is packed up as described in Example I. It is suitable for bakery purpose.

EXAMPLE VII 350 grams ground coconuts, 50 grams milk powder, 600 grams sugar and 1500 grams water of about 60° C. are mixed and homogenized. This flowable mass is then spray dried and further treated as described in Example I.

The dry screen-ground product is suitable for bakery purpose particularly for the manufacture of macaroons.

EXAMPLE VIII 280 grams roasted filberts or hazel nuts are ground and then mixed with 120 grams caramel, 5 grams peanut-butter, 93 grams milk powder, 2 grams ground coffee, 350 grams sugar, 150 grams dextrose and 2 litres water of about 70° C. This mixture is homogenized and then spray dried and treated as described in Example I.

The dry product is suitable for the manufacture of pastries and filling candies or the like.

Without further analysis, the forgoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing a nut-containing mass adapted to form a substantially homogenous mixture with an edible cream, the steps of mixing a non-flowable, finely subdivided nut-containing mass with an aqueous liquid so as to form a flowable mixture; drying said flowable mixture at a temperature sufficiently low to avoid any deleterious effect on the nut content thereof so as to transform said flowable mixture into a dried mass; and finely comminuting the thus formed dried mass, whereby a pulverulent mass is formed adapted to be incorporated in a fat emulsion so as to form a substantially homogeneous mixture.

2. In a method of producing a nut-containing mass adapted to form a substantially homogeneous mixture with a fat emulsion, the steps of mixing a non-flowable, finely sub-divided nut-containing mass with an aqueous liquid so as to form a flowable mixture; drying said flowable mixture at a temperature of up to about 75° C. and sufficiently low to avoid any deleterious effect on the nut content thereof so as to transform said flowable mixture into a dried mass; finely comminuting the thus formed dried mass; and substantially air-tightly packing said dried mass so as to substantially prevent oxidation during storage of the same, whereby a pulverulent mass is formed adapted to be incorporated in a fat emulsion so as to form a substantially homogeneous mixture.

3. In a method of producing a nut-containing mass adapted to form a substantially homogeneous mixture with a fat emulsion, the steps of mixing a non-flowable, finely subdivided nut-containing mass with an aqueous liquid so as to form a flowable mixture of sufficiently low viscosity to permit spray drying thereof; spray drying said flowable mixture at a temperature sufficiently low to avoid any deleterious effect on the nut content thereof so as to transform said flowable mixture into a dried mass; and finely comminuting the thus formed dried mass, whereby a pulverulent mass is formed adapted to be incorporated in a fat emulsion so as to form a substantially homogeneous mixture.

4. In a method of producing a nut-containing mass adapted to form a substantially homogeneous mixture with a fat emulsion, the steps of mixing a finely subdivided nut-containing mass selected from the group consisting of nut meat mass, nougat mass, marzipan mass and persipan mass with an aqueous liquid so as to form a flowable mixture of sufficiently low viscosity to permit spray drying thereof; spray drying said flowable mixture at a temperature of up to about 75° C. and sufficiently low to avoid any deleterious effect on the nut content thereof so as to transform said flowable mixture into a dried mass; and finely comminuting the thus formed dried mass, whereby a pulverulent mass is formed adapted to be incorporated in a fat emulsion so as to form a substantially homogeneous mixture.

5. In a method of producing a nut-containing mass adapted to form a substantially homogeneous mixture with a fat emulsion, the steps of mixing a finely subdivided nut-containing mass selected from the group consisting of nut meat mass, nougat mass, marzipan mass and persipan mass and the nut particles of which are of a particle size of between about 5 and 15 microns with an aqueous liquid so as to form a flowable mixture of sufficiently low viscosity to permit spray drying thereof; spray drying said flowable mixture at a temperature sufficiently low to avoid any deleterious effect on the nut content thereof so as to transform said flowable mixture into a dried mass; and finely comminuting the thus formed dried mass, whereby a pulverulent mass is formed adapted to be incorporated in a fat emulsion so as to form a substantially homogeneous mixture.

6. In a method of producing a nut-containing mass adapted to form a substantially homogeneous mixture with a fat emulsion, the steps of mixing a finely subdivided nut-containing mass selected from the group consisting of nut meat mass, nougat mass, marzipan mass and persipan mass and the nut particles of which are of a particle size of about 8 microns with an aqueous liquid so as to form a flowable mixture of sufficiently low viscosity to permit spray drying thereof; spray drying said flowable mixture at a temperature sufficiently low to avoid any deleterious effect on the nut content thereof so as to transform said flowable mixture into a dried mass; and finely comminuting the thus formed dried mass, whereby a pulverulent mass is formed adapted to be incorporated in a fat emulsion so as to form a substantially homogeneous mixture.

7. In a method of producing a homogeneous mixture of a nut-containing mass and a fat emulsion, the steps of mixing a finely subdivided nut-containing mass with an aqueous liquid so as to form a flowable mixture; drying said flowable mixture at a temperature sufficiently low to avoid any deleterious effect on the nut content thereof so as to transform said flowable mixture into a dried mass; comminuting the thus formed dried mass to a particle size adapted to pass through a 25 mesh per square centimeter screen; and evenly distributing the thus comminuted mass in a fat emulsion.

8. In a method of producing a homogeneous mixture of a nut-containing mass and a fat emulsion, the steps of mixing a non-flowable, finely subdivided nut-containing mass with an aqueous liquid so as to form a flowable mixture; drying said flowable mixture at a temperature of up to about 75° C. and sufficiently low to avoid any deleterious effect on the nut content thereof so as to transform said flowable mixture into a dried mass; comminuting the thus formed dried mass to a particle size adapted to pass through a 100 mesh per square centimeter screen; and evenly distributing the thus comminuted mass in a fat emulsion.

9. In a method of producing a homogeneous mixture of a nut-containing mass and a fat emulsion, the steps of mixing a finely subdivided nut-containing mass selected from the group consisting of nut meat mass, nougat mass, marzipan mass and persipan mass with an aqueous liquid so as to form a flowable mixture of sufficiently low viscosity to permit spray drying thereof; spray drying said flowable mixture at a temperature of up to about 75° C. and sufficiently low to avoid any deleterious effect on the nut content thereof so as to transform said flowable mixture into a dried mass; comminuting the thus formed dried mass to a particle size adapted to pass through a 25 mesh per square centimeter screen; and evenly distributing the thus comminuted mass in a fat emulsion selected from the group consisting of butter cream and whipped cream.

10. In a method of producing a homogeneous mixture of a nut-containing mass and a fat emulsion, the steps of mixing a finely subdivided nut-containing mass selected from the group consisting of nut meat mass, nougat mass, marzipan mass and persipan mass with an aqueous liquid including at least one substance selected from the group consisting of sugars and milk so as to form a flowable mixture of sufficiently low viscosity to permit spray drying thereof; spray drying said flowable mixture at a temperature of up to about 75° C. and sufficiently low to avoid any deleterious effect on the nut content thereof so as to transform said flowable mixture into a dried mass; comminuting the thus formed dried mass to a particle also adapted to pass through a 25 mesh per square centimeter screen; and evenly distributing the thus comminuted mass in a fat emulsion selected from the group consisting of butter cream and whipped cream.

11. In a method of producing a homogeneous mixture of a nut-containing mass and a fat emulsion, the steps of mixing a finely subdivided nut-containing mass selected from the group consistnig of nut meat mass, nougat mass, marzipan mass and persipan mass and the nut particles of which are of a particle size not exceeding about 15 microns with an aqueous liquid so as to form a flowable mixture of sufficiently low viscosity to permit spray drying thereof; spray drying said flowable mixture at a temperature sufficiently low to avoid any deleterious effect on the nut content thereof so as to transform said flowable mixture into a dried mass; comminuting the thus formed dried mass to a particle size adapted to pass through a 25 mesh per square centimeter screen; and evenly distributing the thus comminuted mass in a fat emulsion selected from the group consisting of butter cream and whipped cream.

12. In a method of producing a homogeneous mixture of a nut-containing mass and a fat emulsion, the steps of mixing a finely subdivided nut-containing mass selected from the group consisting of nut meat mass, nougat mass, marzipan mass and persipan mass and the nut particles of which are of a particle size not exceeding about 15 microns with an aqueous liquid including at least one substance selected from the group consisting of sugars and milk so as to form a flowable mixture of sufficiently low viscosity to permit spray drying thereof; spray drying said flowable mixture at a temperature of up to about 75° C. and sufficiently low to avoid any deleterious effect on the nut content thereof so as to transform said flowable mixture into a dried mass; comminuting the thus formed dried mass to a particle size adapted to pass through a 100 mesh per square centimeter screen; and evenly distributing the thus comminuted mass in a fat emulsion selected from the group consisting of butter cream and whipped cream.

13. The product obtained according to the method of claim 1.

14. The product obtained according to the method of claim 7.

References Cited in the file of this patent

UNITED STATES PATENTS

| | | |
|---|---|---|
| 2,431,498 | North et al. | Nov. 25, 1947 |
| 2,511,115 | Lazier et al. | June 13, 1950 |
| 2,511,119 | Mitchell | June 13, 1950 |